(12) United States Patent
Collins

(10) Patent No.: US 6,519,370 B1
(45) Date of Patent: Feb. 11, 2003

(54) DIGITAL IMAGE PROCESSING

(75) Inventor: Nicholas Mark Collins, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/356,917

(22) Filed: Jul. 19, 1999

(30) Foreign Application Priority Data

Jul. 20, 1998 (GB) .............................................. 9815779

(51) Int. Cl.[7] .................................................. G06K 9/36
(52) U.S. Cl. ........................................ 382/286; 382/316
(58) Field of Search ................................ 382/203–206, 382/286, 201, 291, 316, 242; 345/418–424, 440–443

(56) References Cited

U.S. PATENT DOCUMENTS

| | | | | | |
|---|---|---|---|---|---|
| 5,353,396 A | * | 10/1994 | Ahlquist, Jr. et al. | ....... | 345/442 |
| 5,471,536 A | * | 11/1995 | Kurokawa | ................... | 382/315 |
| 5,798,769 A | * | 8/1998 | Chiu et al. | ................... | 345/442 |
| 6,055,337 A | * | 4/2000 | Kim | ........................... | 382/242 |
| 6,211,883 B1 | * | 4/2001 | Goel | ........................... | 345/423 |
| 6,300,955 B1 | * | 10/2001 | Zamir | ........................ | 345/433 |

* cited by examiner

*Primary Examiner*—Jose L. Couso
*Assistant Examiner*—Kanji Patel
(74) *Attorney, Agent, or Firm*—Frommer Lawrence & Haug LLP; William S. Frommer

(57) ABSTRACT

A method of digital image processing for detecting whether a test point within a digital representation of an image lies inside or outside a closed curve defined by an ordered series of curve points within the representation of the image, comprises the steps of:

(i) detecting an angle subtended at the test point by pairs of the curve points adjacent to one another in the ordered series;

(ii) summing the detected angles for all pairs of the curve points adjacent to one another in the ordered series; and (iii) detecting whether the summed angle is equal to a non-zero integral multiple of 360°, thereby indicating that the test point lies within the closed curve.

4 Claims, 3 Drawing Sheets

DIGITAL IMAGE PROCESSING

BACKGROUND OF THE INVENTION

1. Field of the Invention

This invention relates to digital image processing.

2. Description of the Prior Art

Some digital image processing apparatus provides the ability for the user to create an arbitrary closed curve, for example a type of curve known as a spline, on a display screen. Image processing is then carried out depending on whether each point on the image lies inside or outside the closed curve.

A very simple example is that of a graphics drawing system, where a closed spline curve can be created and then "filled" with a wash of a particular display colour. Other more complicated examples occur in the field of video special effects processing, where closed curves of this nature can be used to define regions of an image where a particular special effect is to be performed.

There is therefore a need to establish which points in an image lie inside such a closed curve, and which lie outside. (Points lying on the curve are much easier to detect, and can be defined by convention as lying inside or outside the curve).

Various techniques have been proposed to perform this test, but many tend to fail with complicated curves such as those schematically illustrated in FIGS. 1a and 1b of the accompanying drawings.

SUMMARY OF THE INVENTION

This invention provides a method of digital image processing for detecting whether a test point within a digital representation of an image lies inside or outside a closed curve defined by an ordered series of curve points within the representation of the image, the method comprising the steps of:

(i) detecting an angle subtended at the test point by pairs of the curve points adjacent to one another in the ordered series;

(ii) summing the detected angles for all pairs of the curve points adjacent to one another in the ordered series; and (iii) detecting whether the summed angle is equal to a non-zero integral multiple of 360°, thereby indicating that the test point lies within the closed curve.

The invention provides a method of assessing whether a test point lies inside or outside a closed curve by simply adding up the angles subtended at the test point by all possible adjacent pairs of points defining the curve. If this sum equals zero, then the test point is outside the curve. If the sum equals n.360°, where n is a non-zero integer, then the test point is within the curve. The method has been shown to be more reliable than previous techniques, particularly when dealing with "difficult" curves such as those shown in FIGS. 1a and 1b.

The skilled man will of course realise that the use of the unit "degree" in a definition of the invention and embodiments below is not material to their operation. In fact, whatever units are used in the technique, the important test is whether the summed angle equals a non-zero integral multiple of the angle subtended by a closed circle.

Test points actually lying on the closed curve can be defined by convention to be inside or outside the curve. If such points are defined as being outside the curve then they are correctly detected by the test described above. In another preferred embodiment such points are defined as being inside the curve, and so the method also comprises the step of detecting whether the test point lies on the closed curve. This test could be performed before or after the "main" test to detect whether the test point lies inside or outside the curve.

Preferably the representation of the image comprises an array of pixel values.

The value "n" mentioned above can also be very useful in itself, because as well as indicating whether the test point lies inside or outside the curve it can also give an indication of how many times the curve winds around that test point. So, if "n" is 3, then the curve makes three loops around the test point. If the detected value of "n" is −3, then the curve still makes three loops around the test point but in an opposite sense.

The invention also provides digital image processing apparatus for detecting whether a test point within a digital representation of an image lies inside or outside a closed curve defined by an ordered series of curve points within the representation of the image, the apparatus comprising:

(i) means for detecting an angle subtended at the test point by pairs of the curve points adjacent to one another in the ordered series;

(ii) means for summing the detected angles for all pairs of the curve points adjacent to one another in the ordered series; and (iii) means for detecting whether the summed angle is equal to a non-zero integral multiple of 360°, thereby indicating that the test point lies within the closed curve.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
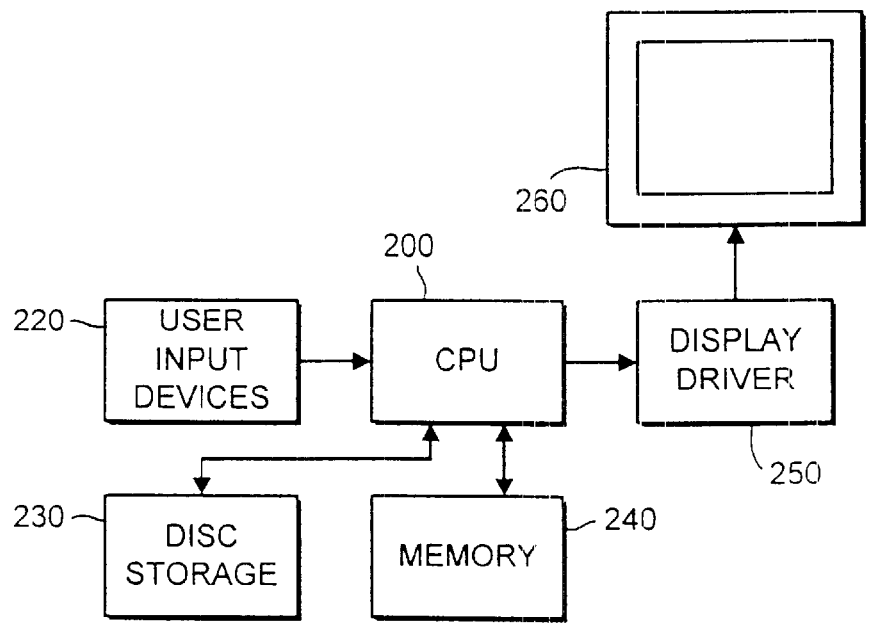
FIG. 2 is a schematic diagram of an image processing apparatus according to an embodiment of the invention.

FIG. 2 is a schematic diagram of an image processing apparatus according to an embodiment of the invention.

The apparatus of FIG. 2 comprises a central processing unit (CPU) 200, connected to user input devices 220 such as computer mouse and a keyboard, disk storage 230, working and program memory 240 and a display driver 250. The output of the display driver is displayed on a computer screen 260.

Figure 1A:
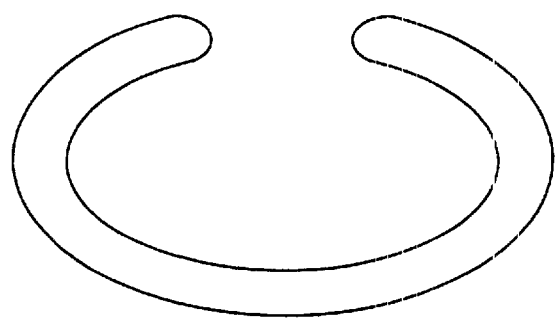
FIGS. 1a and 1b are schematic diagrams of closed curves for which conventional algorithms for detecting whether a point lies inside the curve tend to fail.
Figure 1B:
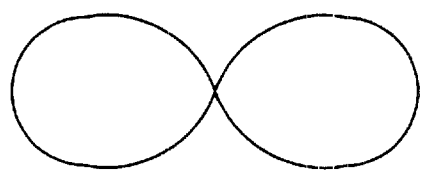

In operation, the current image and an overlaid curve (such as the curves of FIGS. 1A and 1B) are stored in the memory 240 as an array of pixel values. The apparatus is operable either to detect whether a single point lies inside or outside the curve, or to go through each point in an image to detect regions which lie inside and outside the curve.

Figure 3:
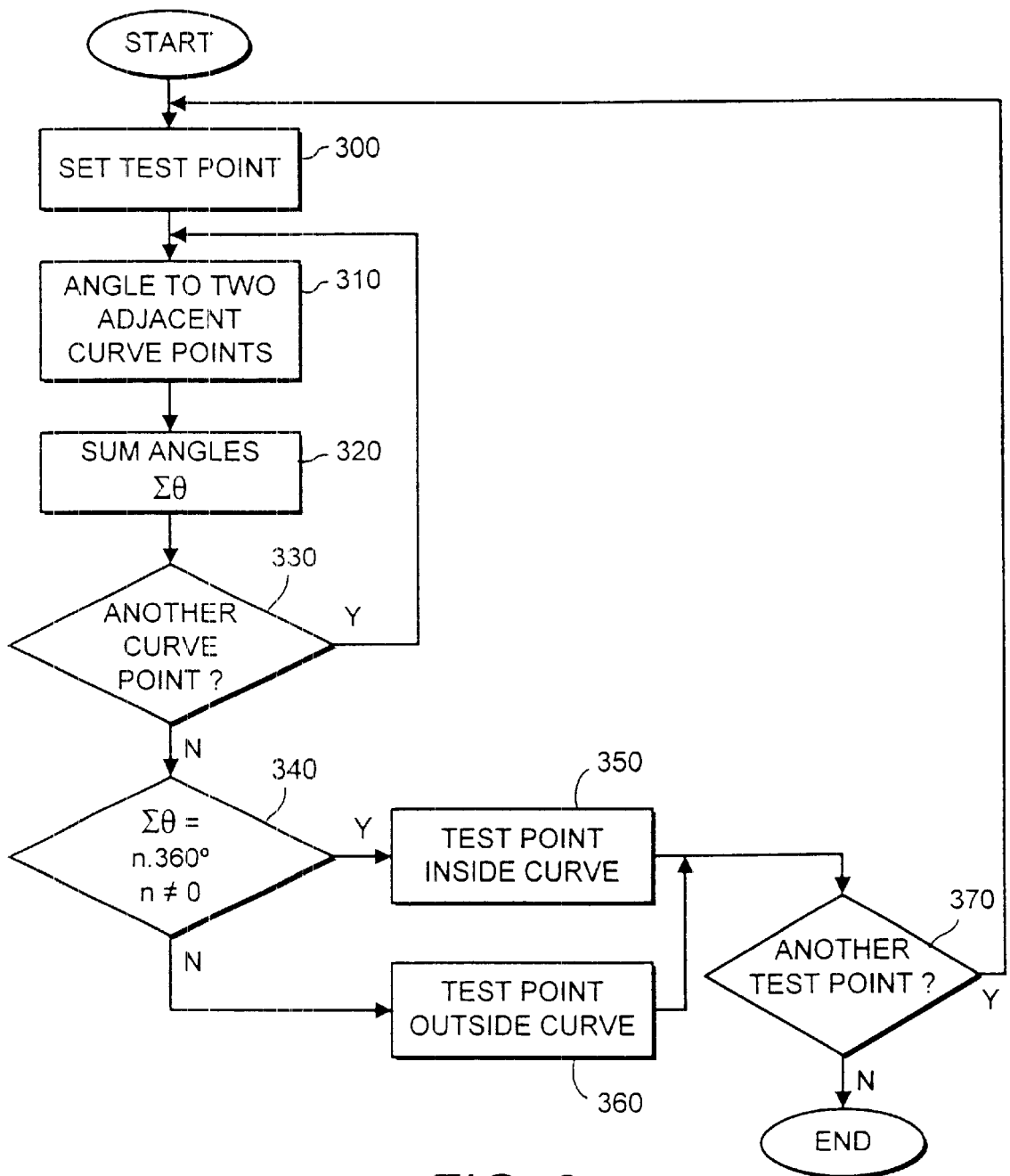
FIG. 3 is a flowchart illustrating the operation of the apparatus of FIG. 3.

FIG. 3 is a flowchart illustrating the operation of the apparatus to do this. The operations of FIG. 3 assume that the test point does not lie on the curve or that points lying on the curve have been defined by convention to be outside the curve. Alternatively, a pre-test or post-test (a simple comparison between the test point position and the curve locus) can be carried out to detect whether the test point lies on the curve.

Accordingly, at a first step 300, the current test point is set. At a step 310, the angle between the test point and two adjacent curve points is detected. At a step 320, this angle is added to a cumulative total angle for this test point. At a step 330, if there is another curve point available, control is passed back to the step 310. If not, control is passed to the step 340 where the cumulative summed angle is compared with n.360°, where n is a non-zero integer.

If the test applied at the step 340 is true, the test point is detected to be inside the curve at a step 350. If not, the test point is detected to be outside the curve at a step 360.

At a step 370, if there is a further test point to be tested, control is passed back to the step 300. If not, the process ends.

Figure 4A:
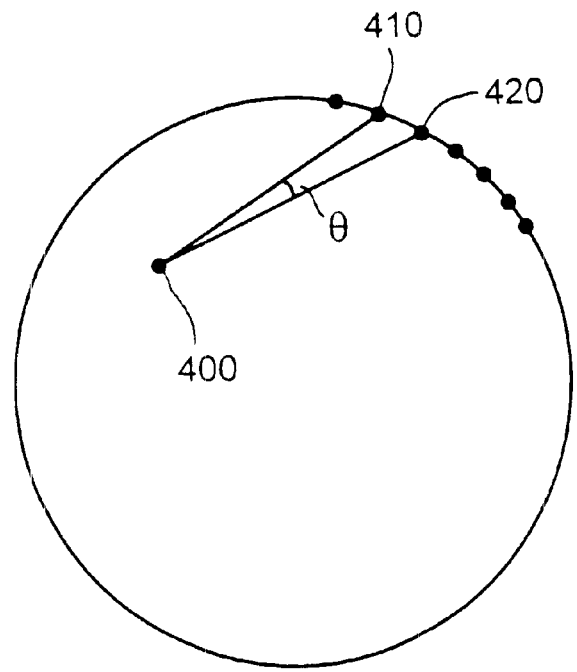
FIGS. 4a and 4b are schematic diagrams illustrating operation of the flowchart of FIG. 3.
Figure 4B:
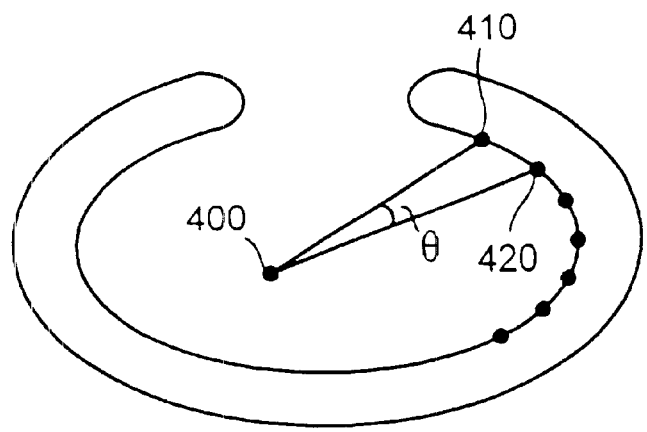

FIGS. 4a and 4b schematically illustrate two curves, showing the operation of the flowchart of FIG. 3. In each case, a test point 400 has been established, and the angle subtended at the test point 400 by two adjacent points defining the curve in question 410,420 is detected. This is summed for all adjacent pairs of curve points.

The value "n" mentioned above can also be very useful in itself, because as well as indicating whether the test point lies inside or outside the curve it can also give an indication of how many times the curve winds around that test point. So, if "n" is 3, then the curve makes three loops around the test point. If the detected value of "n" is −3, then the curve still makes three loops around the test point but in an opposite sense (at least with respect to an ordering of curve points defining the curve).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of digital image processing for detecting whether a test point within a digital representation of an image lies inside or outside a closed curve defined by an ordered series of curve points within said representation of said image, said method comprises the steps of:

(i) detecting an angle subtended at said test point by pairs of said curve points adjacent to one another in said ordered series;

(ii) summing said detected angles for all pairs of said curve points adjacent to one another in said ordered series; and (iii) detecting whether said summed angle is equal to zero or a non-zero integral multiple of 360°, thereby indicating that said test point lies outside said closed curve or within said closed curve, respectively.

2. A method according to claim 1, comprising the step of detecting whether said test point lies on said closed curve.

3. A method according to claim 1, in which said representation of said image comprises an array of pixel values.

4. Digital image processing apparatus for detecting whether a test point within a digital representation of an image lies inside or outside a closed curve defined by an ordered series of curve points within said representation of said image, said apparatus comprising:

(i) means for detecting an angle subtended at said test point by pairs of said curve points adjacent to one another in said ordered series;

(ii) means for summing said detected angles for all pairs of the curve points adjacent to one another in said ordered series; and (iii) means for detecting whether said summed angle is equal to zero or a non-zero integral multiple of 360°, thereby indicating that said test point lies outside said closed curve or within said closed curve, respectively.

\* \* \* \* \*